(No Model.)  2 Sheets—Sheet 1.
J. D. MATTISON.
ANTIFRICTION ROLLER BEARING.
No. 530,544. Patented Dec. 11, 1894.
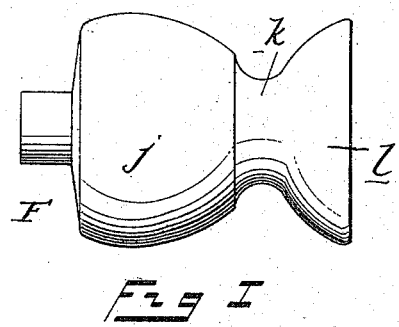
Fig I
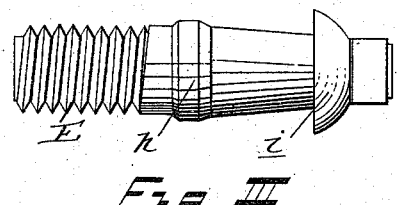
Fig III
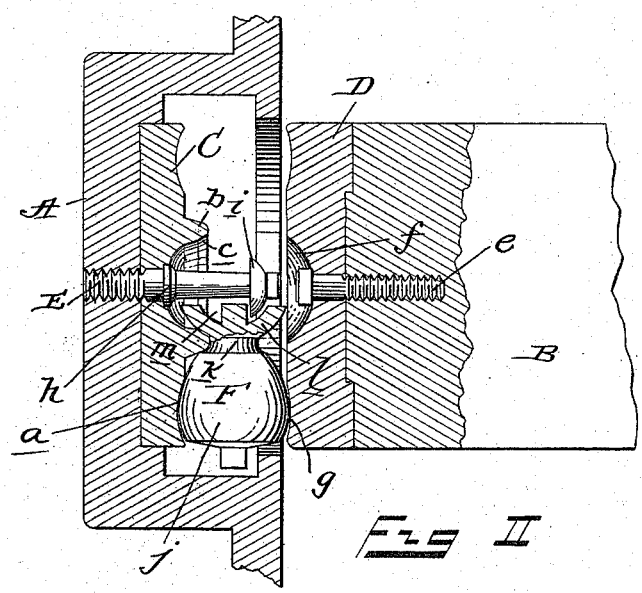
Fig II
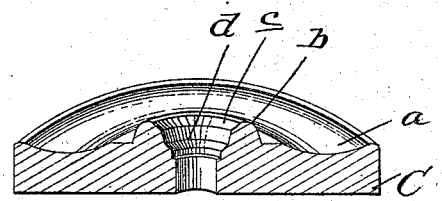
Fig. 4
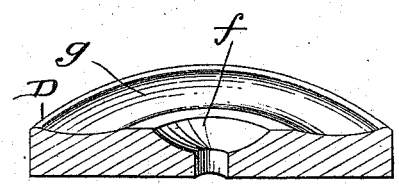
Fig V
WITNESSES
James D Mattison INVENTOR
BY
James J Sheehy
ATTORNEY (No Model.) 2 Sheets—Sheet 2.
J. D. MATTISON.
ANTIFRICTION ROLLER BEARING.
No. 530,544. Patented Dec. 11, 1894.
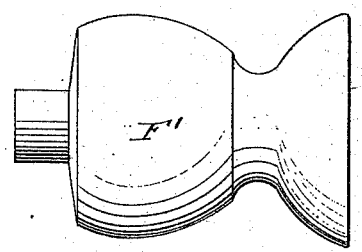
Fig IX
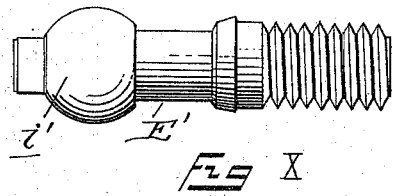
Fig X
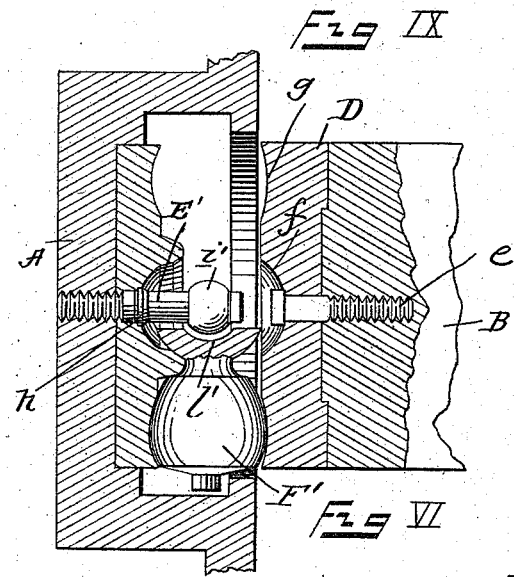
Fig VI
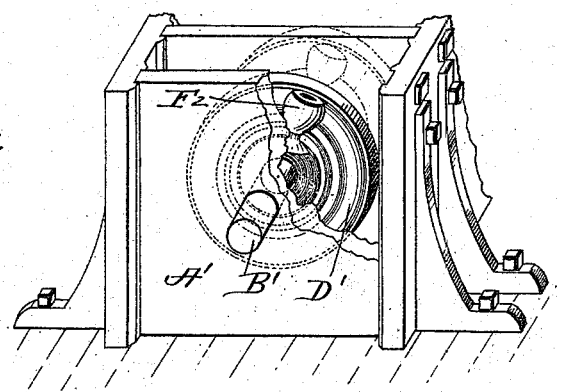
Fig VII
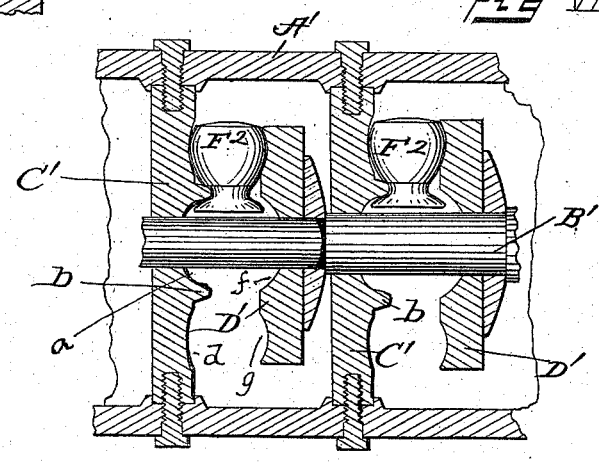
Fig VIII
WITNESSES
INVENTOR
James D. Mattison
BY James J. Sheehy
ATTORNEY

UNITED STATES PATENT OFFICE.

JAMES D. MATTISON, OF SAGINAW, MICHIGAN.

ANTIFRICTION ROLLER-BEARING.

SPECIFICATION forming part of Letters Patent No. 530,544, dated December 11, 1894.

Application filed January 24, 1894. Serial No. 497,916. (No model.)

*To all whom it may concern:*

Be it known that I, JAMES D. MATTISON, a citizen of the United States, residing at Saginaw, E. S., in the county of Saginaw and State of Michigan, have invented certain new and useful Improvements in Antifriction Roller-Bearings; and I do declare the following to be a full, clear, and exact description of the invention, such as will enable others skilled in the art to which it appertains to make and use the same.

My invention relates to improvements in anti-friction roller bearings such as disclosed in my prior application filed January 12, 1894, Serial No. 496,523; and it has for its general object to provide a simple and advantageous bearing which will effectually obviate the friction and consequent frictional wear heretofore caused by the endwise thrust of the journal, shaft, or the like.

With the foregoing end in view, the invention will be fully understood from the following description and claims when taken in connection with the annexed drawings, in which—

Figure I, is an enlarged elevation of the peculiar roller embodied in my bearing. Fig. II, is a diametrical section taken through the bearing and journal. Fig. III, is an enlarged elevation of the pin which serves to guide the roller and which also serves to connect the bearing disk to the head of the box. Fig. IV, is a sectional, perspective of the bearing disk of the box removed. Fig. V, is a similar view of the bearing disk of the journal. Fig. VI, is a diametrical section illustrating a slightly modified construction. Fig. VII, is a perspective view, partly broken away, illustrating the invention adapted for the shafts of steam-ships, and the like. Fig. VIII, is a diametrical section of the construction shown in Fig. VII, and Figs. IX and X, are elevations of the roller and pin employed in the construction illustrated by Fig. VI.

Referring by letter to said drawings, and more particularly to Figs. I, to V, thereof—A, indicates the head of a journal or axle box which may be of any approved form and construction. B, indicates a journal or axle, and C, D, indicate bearing disks of hardened steel or other suitable metal, which are designed to be connected to the box A, and journal B, respectively, as will be presently described.

The disk C, of the box head is provided in its inner side or face and adjacent to its edge or periphery (see Fig. IV), with a circular groove or way $a$, the bottom of which describes a concave curve, as shown; and said disk is also provided adjacent to its center with an annular rib or projection $b$, the space between the inner edge of the groove $a$, and the rib or projection $b$, being preferably flat, as shown. The rib or projection $b$, is rounded convexly upon its outer side and edge, and it is provided in its inner side with a groove $c$, the bottom of which describes a concave curve and merges into the recess $d$, formed within the rib or projection as illustrated.

The disk D, of the journal which is preferably connected thereto by a screw as $e$, is provided with a central recess $f$, and with a circular groove or way $g$; and this groove or way $g$, is similar to the groove $a$, of the disk C, with the exception that it is more shallow in order to permit the journal to move slightly in a lateral direction without moving or displacing the anti-friction roller.

E, indicates the threaded pin which serves to connect the disk C, to the head of the box A. This pin E, is preferably shouldered, as shown at $h$, so as to prevent play of the disk, and it extends inwardly from said disk and is provided with a head $i$, which preferably has its outer side rounded, as shown, for a purpose presently described.

F, indicates the anti-friction roller which is interposed between the disks C, D, of the journal and box and is designed to obviate frictional wear of the same. This roller comprises an enlarged and convexly rounded body $j$, which is designed to engage the grooves $a$, $g$, of the disks C, D, a reduced and concave neck $k$, which is designed to engage the outer side and edge of the annular rib or projection $b$, and a convexly rounded head $l$, which is designed to travel in the groove $c$, of the projection $b$, and thereby prevent radial movement or displacement of the roller, which would result in abrasive friction and consequent wear.

As shown in Fig. II, of the drawings, the roller F, is provided in its inner end with a circular recess $m$. This recess is of a shape in cross section to receive the head $i$, of the pin E, which takes therein and serves to prevent lateral movement of the inner end of the roller.

The diameters of the body $j$, neck $k$, and head $l$, of the roller F, are of such proportional sizes that the body will make a complete circuit in the grooves $a$, $g$, while the neck and head are completing a revolution above the rib or projection $b$. Thus it will be seen that there will be no dragging of any part of the roller and consequently no abrasive friction, which is a desideratum.

In Figs. VI, IX, and X, I have shown a construction which is similar to that embodied in Figs. I to V with the exception that the pin E', is provided with a globular head $i'$, and the roller F', is provided with a central recess $l'$, shaped to receive the same.

In Figs. VII and VIII, I have shown my improved bearing as adapted for use in conjunction with the shafts of steam ships, &c. In the said figures A', indicates a journal box having the disks C', fixed in any approved manner, and B', indicates the shaft having the disks D'. These disks C', and D', are provided with grooves and recesses $a$, $d$, and $g$, $f$, respectively, and the disks C', are also provided with annular ribs or projections $b$, designed to engage the rollers $F^2$, which are similar in construction to the rollers F, F', with the exception that they have no recesses in their ends.

It will be noted from the foregoing description, taken in conjunction with the drawings that my invention may be applied with equal facility to journals and to the shafts of steam ships, mills, &c., and it will also be noted that the interposed rollers by reason of their peculiar formation will absolutely obviate any friction that would otherwise be caused by the endwise thrust of the journal, shaft, or the like.

In the foregoing specification, I have specifically described the exact construction and arrangement of parts in the preferred embodiments of my bearing, in order to impart a full and exact understanding of the same, but I do not desire to be understood as confining myself to such exact construction and arrangement of parts as I reserve the right to make, in practice, such changes or modifications, as fairly fall within the scope of my invention.

Having described my invention, what I claim is—

1. In a roller bearing, the combination with a box having a circular rib or projection and a circular groove, and a journal or shaft; of an interposed roller comprising a body adapted to travel in the groove of the box, a reduced neck, and a head to engage the rib or projection of the box, substantially as and for the purpose set forth.

2. In a roller bearing, the combination with a box having a circular rib or projection and a circular groove, and a journal or shaft also having a circular groove; of an interposed roller comprising a body adapted to travel in the grooves of the box and journal, a reduced neck, and a head to engage the rib or projection of the box, substantially as and for the purpose set forth.

3. In a roller bearing the combination with a box having a circular rib or projection and also having a circular groove, a journal or shaft also having a circular groove, and a pin extending inwardly from the center of the box and having a head or enlargement; of an interposed roller comprising a body, a reduced neck, and a head adapted to engage the rib or projection of the box; the said roller being also provided in its inner end with a recess to receive the head or enlargement of the pin carried by the box, substantially as specified.

4. In a roller bearing, the combination with a box, a disk of hardened steel having a circular groove in one side and also having a circular rib or projection, a pin E, connecting said disk to the box and extending inwardly from the disk and having a head or enlargement $i$, a journal, and a disk of hardened steel connected to the inner end of the journal and having a circular groove corresponding in diameter to that of the disk of the box; of a roller interposed between the disks of the journal and box and comprising a body adapted to engage the grooves of said disks, a neck and a head to engage the circular rib or projection of the disk of the box; said roller also having a circular recess in its end to receive the head or enlargement of the pin E, all substantially as and for the purpose set forth.

In testimony whereof I affix my signature in presence of two witnesses.

JAMES D. MATTISON.

Witnesses:
HARVEY A. PENNEY,
TILLIE M. WEY.